United States Patent [19]

Mamonov

[11] Patent Number: 5,495,911
[45] Date of Patent: Mar. 5, 1996

[54] TRAILER-CONTAINER CONVERTIBLE INTO AIR CUSHION SUPPORT BASE FOR AUTOMIBILE

[75] Inventor: Alexandr S. Mamonov, Kirov, Russian Federation

[73] Assignee: Tovarischestvo S. Ogranichennoi Otvetstvennostju, Kirov, Russian Federation

[21] Appl. No.: 162,179

[22] Filed: Apr. 5, 1994

[51] Int. Cl.$^6$ ................................ B60V 3/00; B63B 7/00
[52] U.S. Cl. ................................ 180/116; 440/11
[58] Field of Search ................................ 180/116, 117, 180/119, 127; 440/11

[56] References Cited

U.S. PATENT DOCUMENTS 3,270,827  9/1966  Mantle ................................ 180/116

FOREIGN PATENT DOCUMENTS 3029763  3/1982  Germany ................................ 440/11
3033938  7/1982  Germany .
178205  7/1993  Japan ................................ 180/116

Primary Examiner—Mitchell J. Hill
Attorney, Agent, or Firm—Ladas & Parry

[57] ABSTRACT

A trailer-container for a vehicle (1) which can be converted into a support base on an air cushion comprising a rigid sectionalized platform (4) equipped with a flexible inflatable air cushion skirt (5) with removable rotor-type power plants (6) and means for coupling them to the drive of the vehicle (1) mounted on the platform. The platform (4) of the trailer-container is made of rigid interconnected sections which can be folded into a compact package. The sections are connected to the flexible inflatable skirt (5). Each of the power plants (6) is made as a blower fan and a variable-pitch air screw which are mounted coaxially in a common ring housing. The platform (4) together with the skirt (5) is fitted with disengagable attachment joints for securing it to the wheelbase of the vehicle (1) so that disturbances of the platform and skirt can be damped by suspension of the vehicle when in motion. The steering gear is made as aerodynamic rudders which are installed on the platform and are fitted with flexible rods for connecting them to the steering mechanism of the vehicle (1).

11 Claims, 4 Drawing Sheets

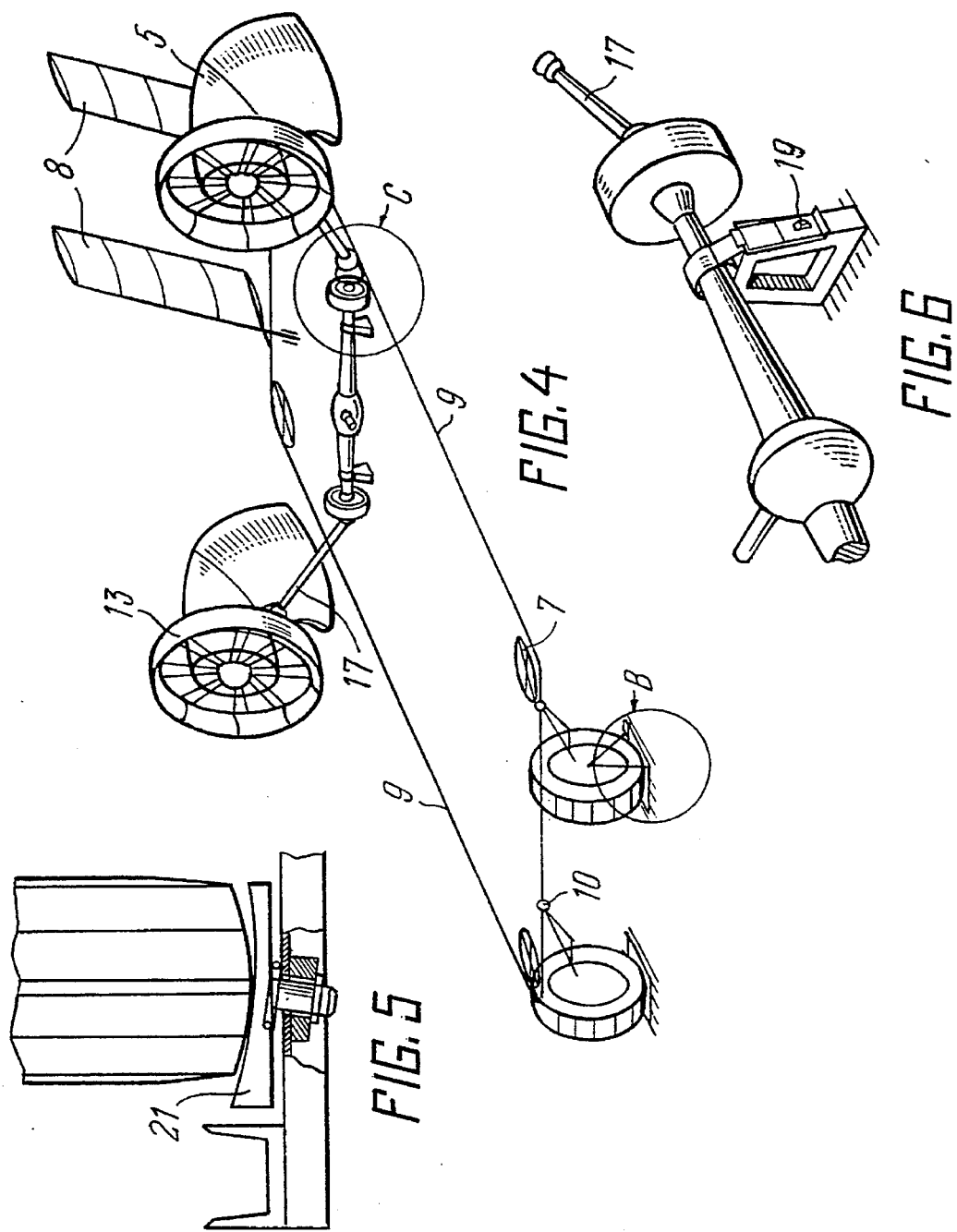

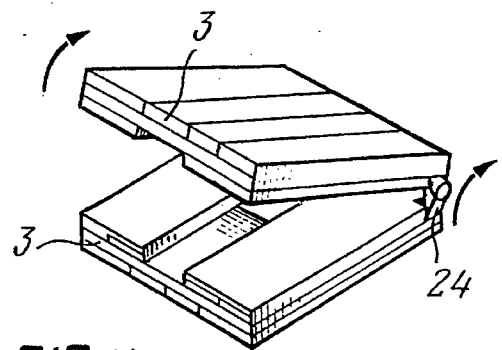
FIG.11
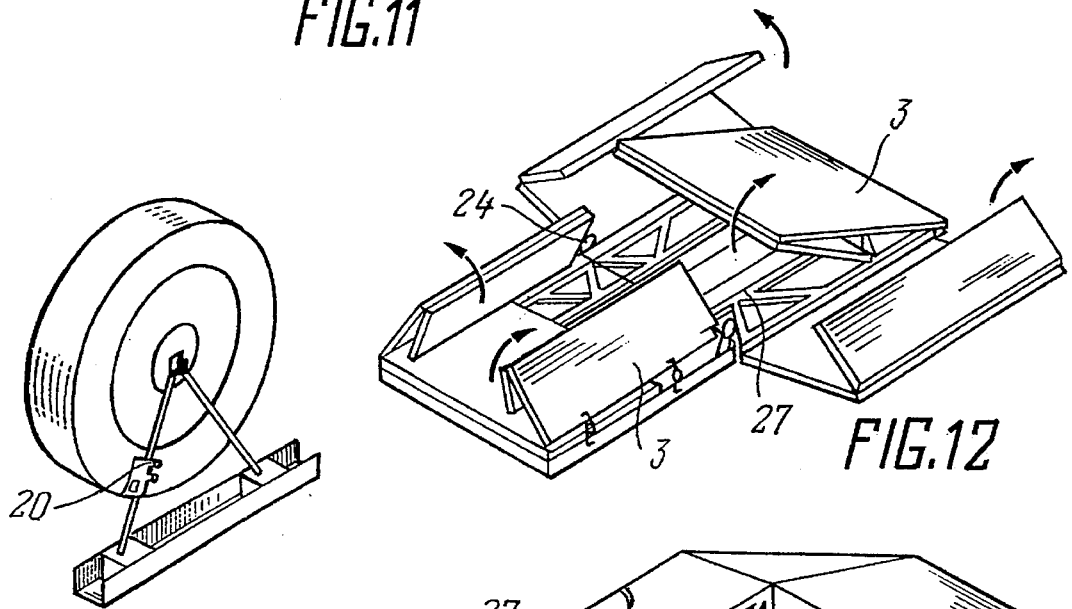
FIG.10
FIG.12
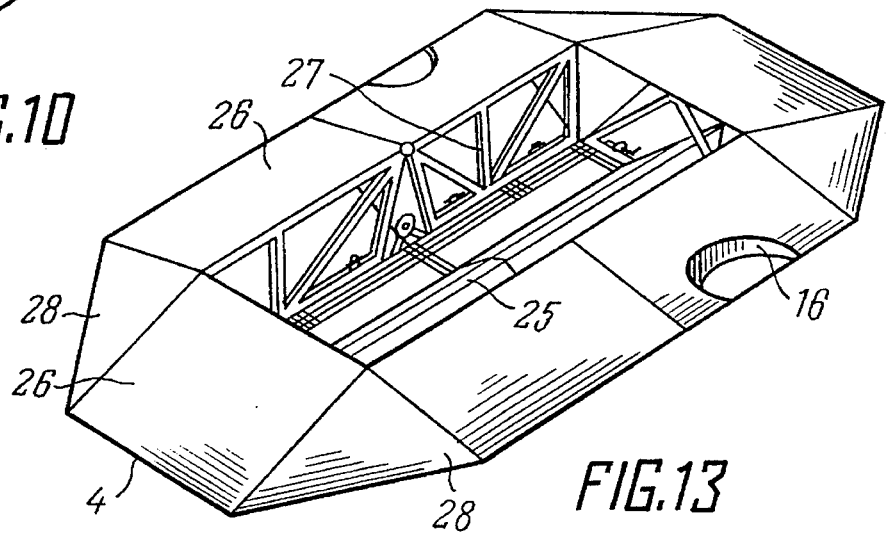
FIG.13

5,495,911

TRAILER-CONTAINER CONVERTIBLE INTO AIR CUSHION SUPPORT BASE FOR AUTOMIBILE

FIELD OF INVENTION

This invention relates to trailers with a container-like body which can be converted into an air cushion support base.

PRIOR ART

Known is an automobile GEM kit (U.S. Pat. No. 3,211,124) for temporarily converting any conventional automobile into an automobile on air cushion which incorporates a rigid sectionalized platform with a removable inflatable skirt and mounted thereupon are removable power plants (fans), steering gear and means for coupling these power plants and the steering gear to automobile units.

But complete desectionalization and disassembly of the rigid platform and storage of all parts of the air cushion automobile kit in the automobile themselves prolong the assembly time and reduce effective cargo-carrying capacity of the automobile.

Known is also an automobile-towed trailer-container for converting the automobile into a ground effect (air-cushion) machine (DE, Ai, 3,033,938) which comprises a rigid platform with a flexible inflatable skirt whereupon are mounted removable multiple rotor-type power plants, steering gear and means for coupling these power plants and the steering gear to the automobile drive assembly and means for coupling the trailer-container base to the automobile.

The above-mentioned trailer-container incorporates a multimember build-up and knock-down structure which forms a supporting body for the automobile and that increases the time required to assemble the supporting body as well as its weight thus reducing effective cargo-carrying capacity of the automobile when towing the trailer.

SUMMARY OF INVENTION

Objects of this invention are: to provide an automobile with a trailer-container which is convertible into an air cushion support base for this automobile and is so designed that through reduction of the support base assembly time and through increasing effective cargo-carrying capacity, when towing the trailer, operational capabilities of the automobile are improved.

With these and other objects in view, the invention comprises the novel organization of principles and the arrangement of parts hereinafter described, and illustrated by accompanying drawings. Thus, according to the invention, the base platform of the trailer-container is composed of rigid sections which are so connected to each other that they can be folded into one compact flat package. Peripheral (or perimeter) sections can in an airtight fashion be connected to an inflatable air cushion skirt. There are two removable rotor-type power plants, a steering gear assembly and means for coupling them to the automobile drive assembly as well as means for coupling the base platform of the trailer to the automobile. Each of the power plants comprises a blower and a propeller and they are fitted with means for coupling them to the aforementioned drive assembly in such a manner that their operating modes are independently controllable.

Each of the power plants should incorporate a blower fan and a variable pitch airscrew coaxially mounted in a common ring housing.

The rigid platform together with the aforementioned air cushion skirt of such a trailer-container may be, while translating on a cushion of air, connected by disengagable joints to the automobile wheelbase.

Each of the power plants may be provided with kinematic coupling connecting it to the automobile drive assembly and this kinematic coupling mechanism may be fitted with a constant angular velocity joint.

Preferably the steering gear of the trailer-container should be made in a form of aerodynamic rudders which are installed on the rigid platform and connected through flexible rods to the steering gear of the automobile.

The rigid platform should incorporate several groups of the above-mentioned sections which are hingedly interconnected and can be unfolded groupwise along the automobile and folded back into a flat compact package. In each of these groups the middle sections forming the undersurface of the air cushion support base should be connected by flexible air-tight seals so that they can be assembled at an angle to each other and act as a hollow longitudinal stability keel. The cavity of this keel should communicate with the cavity of the flexible skirt.

Side and front and back portions of the rigid platform may be arranged as triangular air ducts formed up by perimeter sections where the outer edges of these sections are hinged together and their edges open up inwardly and are supported by frame girders.

At each of the four corners of the rigid platform the adjacent air ducts should be linked together by sections of triangular shape.

BRIEF DESCRIPTION OF THE DRAWINGS

Objects and advantages of the invention will be apparent from the following description and accompanying drawings in which:

FIG. 4 is a perspective view of the drive mechanism of the power plant and the drive mechanism of the steering gear of the air cushion support base which are operated through a driving axle and a front wheel non-driving axle respectively;

FIG. 5 is a perspective view of unit "B" of FIG. 4 which is a thrust bearing of a steerable wheel of the automobile;

FIG. 6 is a perspective view of unit "C" of FIG. 4 by means of which the rearwheel driving axle of the automobile is secured;

FIG. 10 is a perspective view of the attachment point by means of which non-driving wheels of the automobile are secured to the rigid platform;

FIG. 11 is a perspective view of two groups of the rigid platform sections in the initial stage of unfolding them into horizontal plane;

FIG. 12 is a perspective view of each group of the rigid platform sections when being unfolded into the horizontal plane;

FIG. 13 is a perspective view of the unfolded rigid platform with accessories off.

DETAILED DESCRIPTION

Figure 1:
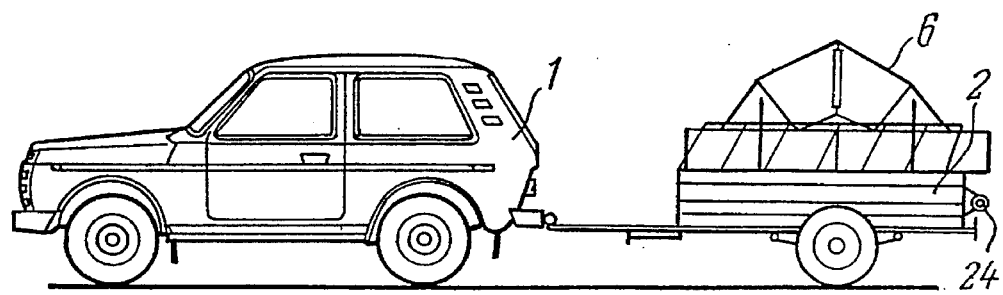
FIG. 1 is a general side view of the vehicle, in this particular case an automobile, with a trailer-container in initial travel position.

Referring now to the drawings and describing this invention in detail, a trailer-container, when being transported on wheels along the road, as shown in FIG. 1, is coupled to an automobile 1 and in this case it rests on its own wheels. All of the body 2 of the trailer-container is formed by sections 3 of the right platform 4 which are converted into an air-cushion support base with a flexible skirt (FIG. 2).

Figure 2:
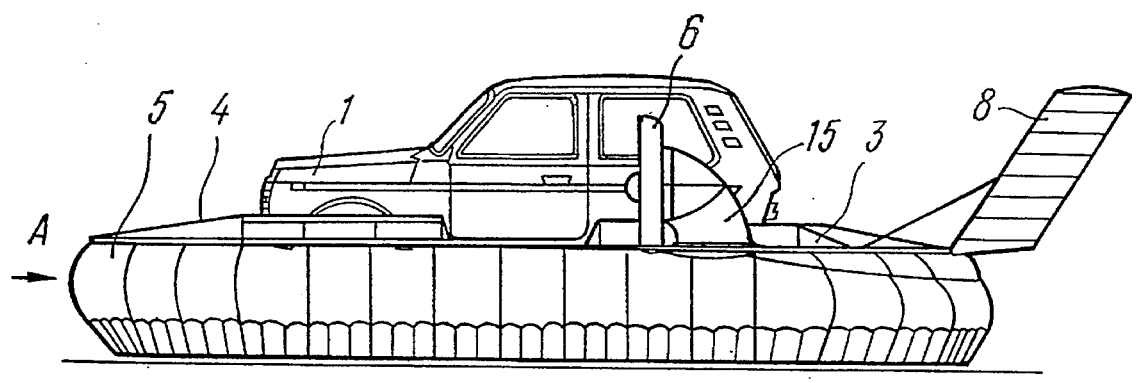
FIG. 2 is a vertical longitudinal section of an automobile with a trailer-container convertible into an air cushion support base for this automobile.

Referring now to FIGS. 2 and 4, the skirt 5 is attached by means, for instance, of hinge connections with air-tight seals to edges of lower side and front and rear sections 3 of the rigid platform 4 and it is packaged together with these sections. Power plant 6 is also accommodated in the trailer body 2 wherein mounted on its bottom plate are means 7 of the air-cushion support base steering gear, aerodynamic rudders 8 for directional control of the air-cushion support base and cables 9 acting as flexible connecting rods.

When being transported by the automobile, the body 2 of the trailer also contains dismantled means for coupling the power plant 6 to the drive assembly of the automobile.

The rigid platform 4, as shown in FIG. 2, is composed of sections 3 interconnected by hinges which are so designed that the sections can be folded in groups of sections into a single compact flat package, as illustrated by FIG. 11. In this state the connection between the rigid platform sections 3 and the skirt 5 of the air cushion is air-tight.

Control cables 9 of the steering gear and bending-around members 7 are coupled to aerodynamic rudders 8, as shown in FIG. 4, and to the steering mechanism 10 of the vehicle towing the trailer, be it an automobile 1, a caterpillar tug or the like.

Figure 7:
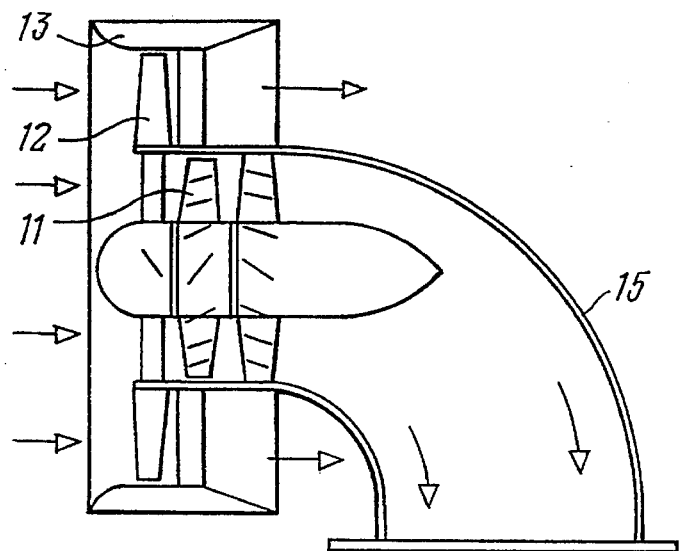
FIG. 7 is a vertical longitudinal section of the power plant.

Referring now to FIG. 7, each power plant 6 represents in itself an assembly comprising a fan-blower 11 for creating a cushion of air under the support base and a variable-pitch airscrew 12 capable of building up controllable thrust and thus changing the speed of translational motion of the air-cushion support base with an automobile 1 placed on it. The blower fan 11 and the airscrew 12 are installed in common ring housing 13.

Figure 3:
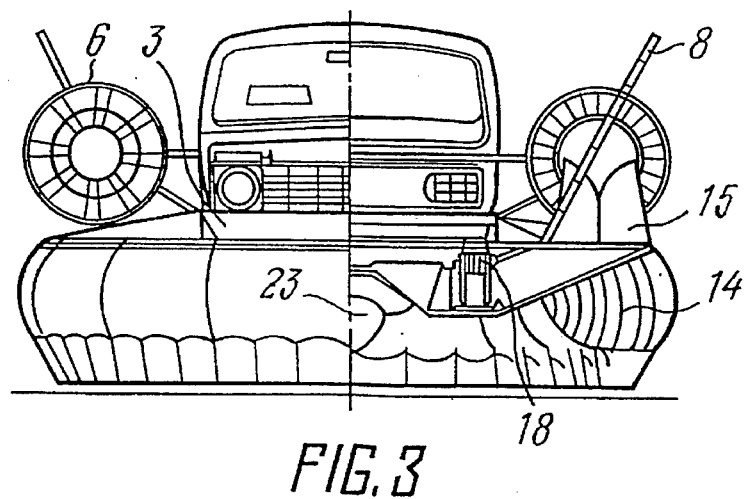
FIG. 3 is a vertical sectional end view taken along the line A of FIG. 2.

The skirt 5 of the air-cushion is equipped with an inflatable circular-shaped air tube 14, as shown in FIG. 3, which communicates through air ducts 16, shown in FIG. 13, with air ducts 15 of the powerplants 6, as illustrated by FIG. 7. They are symmetrically located on both sides of the rigid platform 4 of the air-cushion support base.

Each of the power plants 6 is provided with a kinematic transmission mechanism 17, shown in FIG. 4, for coupling it to the drive axle of the automobile 1.

To ensure equal rotational speeds of impellers of blowers 11 and airscrews 12 mounted together in one-piece power plant 6 which are installed on side portions of the air-cushion support base the kinematic transmission mechanisms 17 are provided with constant angular velocity joints 18, as shown in FIG. 3.

Figure 9:
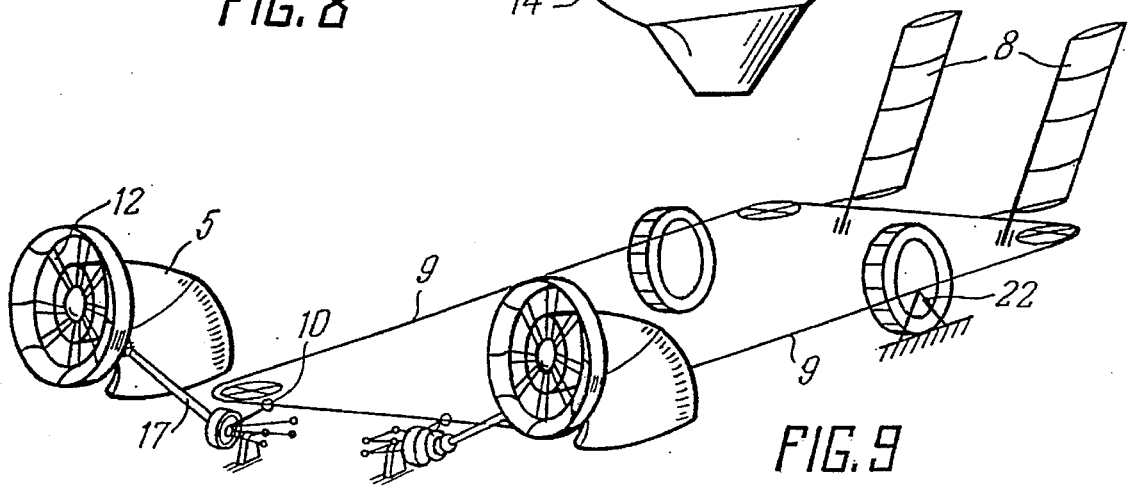
FIG. 9 is a perspective view of the drive mechanisms of the power plant and of the steering gear when operated through a front wheel driving axle of an automobile.

In case of a rear-wheel drive automobile the kinematic transmission mechanism 17, shown in FIG. 4, couples the power plants 6 to the automobile rear axle, but when an automobile is of a front-wheel drive type the power plants 6 are coupled through the similar transmission mechanism, shown in FIG. 9, to the automobile front axle.

Referring to FIG. 6, the rigid platform 4 is equipped with the grips 19 for securing the drive axle of the automobile 1 when the automobile is mounted on the trailer-container after it has been converted into the air-cushion support base. Also installed on this platform are turnbuckles 20 for fixing non-driving wheels of the automobile, as illustrated by FIG. 10. Also mounted on the rigid platform 4 are bearings 21, shown in FIG. 5, for accommodating steerable wheels of the automobile 1 which can be deflected horizontally by cables 9 connected to the automobile steering mechanism 10 and rudders 8, as shown in FIG. 4.

To increase buoyancy of the air-cushion support base carrying the automobile 1 while translating over clear water area there may be inflatable air tanks (or reservoirs) 22 placed between the sections 3 of the platform 4 along the sides and at the front and back of this platform.

The skirt 5 has a hollow longitudinal keel 23 which equalizes the pressure in front and rear portions of the air tube 14 of the skirt 5, as shown in FIG. 3.

The rigid platform 4 is made up of sections 3 which are connected by hinges, as illustrated by FIG. 11, and can be unfolded alongside the automobile 1 and folded back into one package. In each group the sections 3 forming up the undersurface of the air cushion support base are connected by flexible air-tight straps 25, shown in FIG. 13. Middle sections 3 of the undersurface may be installed at an angle to each other so as to shape the top portion of the keel 23. Grips 19, bearings 21 and turnbuckles 20 mounted on the bottom sections are always in the ready-for-use condition and are never dismantled; they are not shown in FIGS. 12 and 13.

Figure 8:
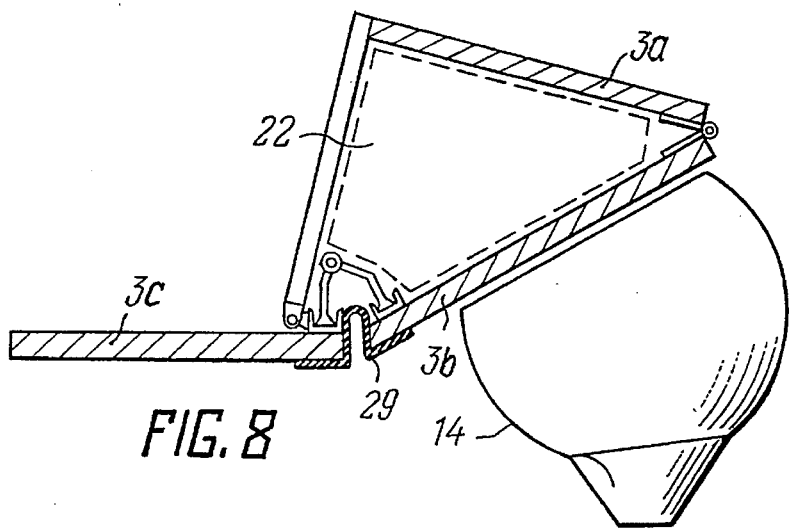
FIG. 8 is a vertical sectional view of the hinge connection linking adjacent portions of the rigid platform between which there is an inflatable reservoir.

Side and end portions of the rigid platform 4 of the air-cushion support base are shaped as triangular air ducts 26, as illustrated by FIG. 13. These ducts are formed by perimeter sections 3 of the platform 4 which are hinged at outboard edges wherefrom these sections open up into a triangular structure supported at their inner edges by frame girders or girder sections 27. As shown in FIG. 8, the section members 3 can include perimeter sections 3a and undersurface sections (including middle sections 3b and inside sections 3c) forming the undersurface of the platform. Adjacent frame girders 27 of the platform front and back and sides are interlinked. At each of the four corners of the rigid platform 4 the adjacent triangular ducts 26 are fitted together by means of additional detachable triangular sections 28. All hinge joints between undersurface sections 3b and 3c located on the undersurface of the platform 4 are fitted with airtight seals 29, as illustrated by FIG. 8.

Use of the trailer-container convertible into the air cushion support base for an automobile with wheels may be described in the following sequence, as illustrated by Figures mentioned below.

The trailer with its body 2 is uncoupled from the automobile 1. The wheels of the trailer are removed. The sections 3 of the rigid platform 4 are unfolded around their hinges into operational condition and the circular-shaped air tube 14 of the air cushion skirt 5 is arranged in its proper position.

To accomplish this, the power plant 6 together with means for coupling them to the automobile drive assembly and aerodynamic rudders 8 are taken out of the package which is formed, while being transported, by groups of sections.

This done, the groups of sections 3 are unfolded around the hinge joints 24 and fixed horizontally.

After that the interconnected by hinges sections 3 of each group are also unfolded and arranged in the same horizontal plane. Sections of one of the end portions of the rigid platform 4 are fixed in unfolded position in this plane.

Perimeter sections 3 of both side portions and of one of the ends of the rigid platform 4 are turned up around the hinges connecting them to the outer edges of the undersurface of this platform and their inner edges are linked by frame girders 27. The triangular air ducts 26 having thus been assembled, the inflatable air tanks 22, shown in FIG. 8, which are filled with air when travelling over water, are arranged in the cavities of the ducts.

Adjacent air ducts 26 of both side portions and of the front end portion which are now assembled into a "n"-shaped structure are connected at the corners by additional triangular sections 28.

Middle sections 3 of the rear end portion being in fixed unfolded position represent now a ramp over which the automobile to be carried is driven onto its air cushion support base.

The automobile 1 is driven along this ramp and onto the bottom sections of both groups. When the wheelbase of the automobile is secured on them by the grips 19 and turnbuckles 20 the sections 3 of the rear end portion are assembled into the similar triangular air duct 26 and by means of respective frame girders 27 and additional sections 28 the above-mentioned "n"-shaped structure of the platform 4 is closed and completed. Prior to assembling the last air duct its inflatable air tank 22 must be fitted into it. Now, to transfer the air cushion support base into operational condition and to create a cushion of air the power plant 6 are mounted on the platform 4, the rudders 8 are installed into their proper places and connected by the cables 9 to the steering mechanism 10 of the automobile 1.

When a rear-wheel-drive automobile is used the driving mechanism of the power plant 6 are coupled to the automobile rear axle, as shown in FIG. 4. This axle is secured to the bottom sections 3 of the platform 4 by the grips 19. Front wheels of the automobile being placed on the bearings 21 for free horizontal deflection, the movement of the automobile steering mechanism 10 causes through the cables 9 angular displacement of the rudders 8, as shown in FIG. 5.

When a front-wheel-drive automobile is used, as illustrated by FIG. 9, the blower fans 11 and the airscrews 12 of the power plant 6 are rotated from the automobile front axle which is secured to the platform 4 by attachment units with grips 19. The blower fans 11 and airscrews 12 can be coupled not only to the automobile driving axles but also to a power take-off shaft if the latter is available in this model of vehicle. Movement of the steering drive of the above-mentioned front-wheels driving axle causes the aerodynamic rudders 8 to deflect; this is accomplished through the cables 9, whereas the rear non-driving wheels of the automobile in this case are fixed to the sections 3 of the platform 4 by means of the turnbuckles 20.

When using driving axles of automobile wheels, of caterpillars of a tractor or of another vehicle, the blower fans 11 ensure operational condition of the air cushion skirt 5 by forming a cushion of air under the support base into which the trailer-container has been converted. At the same time the airscrews 12 of the power plant 6 build up controlled propulsive thrust to control the speed of the translational motion of the air-cushion support base carrying the automobile. The rudders 8 ensure steerability and directional stability of the air-cushion support base into which the trailer-container has been converted.

The transformation of the air cushion support base of the automobile 1 back into its trailer-container condition is accomplished in the reverse sequence.

Having thus described my invention I claim:

1. An apparatus that can be hauled as a trailer by a vehicle and that can be converted into an air cushion support base for the vehicle, said trailer comprising a body for containing cargo, said air cushion support base having at least one air duct for an inflatable air tank and a cavity for an air cushion, said apparatus comprising section means for forming the body of the trailer and for converting the body into a platform for supporting the vehicle, said section means comprising undersurface sections, perimeter sections, girder sections, and hinge means for connecting said undersurface sections to said perimeter sections such that the perimeter sections can be linked to the undersurface sections by the girder sections to form the at least one air duct, each of said undersurface and perimeter sections having a planar surface whereby the undersurface sections and perimeter sections can be folded with the planar surface of each perimeter section lying flat against the planar surface of, said apparatus further comprising flexible inflatable skirt means connected in air-tight relationship to said perimeter sections for forming the cavity for the air cushion.

2. An apparatus as claimed in claim 1 wherein the vehicle comprises a wheelbase and the apparatus comprises disengagable attachment means for securing the wheelbase of said vehicle to said platform.

3. An apparatus as claimed in claim 2 further comprising power plant means for creating a cushion of air in the air cushion support base and for building up a controllable thrust for changing a speed of translational motion of the air cushion support base, said power plant means being detachably mountable on said platform.

4. An apparatus as claimed in claim 3, wherein the vehicle comprises a drive assembly and said power plant means comprises a blower fan and an airscrew and the apparatus further comprises coupling means for coupling the blower fan and the airscrew to the drive assembly of the vehicle, said coupling means permitting independent operation of the blower fan and airscrew.

5. An apparatus as claimed in claim 4, wherein the power plant means comprises at least one ring housing and the blower fan and the airscrew each comprises a shaft, the shaft of the blower fan and the shaft of the airscrew being coaxially mounted in the ring housing.

6. An apparatus as claimed in claim 4, wherein the vehicle has a propeller drive and the apparatus comprises a constant velocity joint coupling the power plant means to the propeller drive of the vehicle.

7. An apparatus as claimed in claim 3 further comprising steering means installed on the platform for steering the air cushion support base.

8. An apparatus as claimed in claim 7, wherein the steering means comprises at least one rudder that can be installed on the platform, said apparatus further comprising rods for coupling the at least one rudder to a steering mechanism of the vehicle.

9. An apparatus as claimed in claim 7, wherein each of the undersurface sections comprises an inside section and a middle section, said inside and middle sections being connected to each other by a hinge joint fitted with an air-tight seal, said inside sections, middle sections and perimeter sections being hingedly connected and disposed with respect to one another such that the perimeter sections can be linked to the inside sections by the girder sections to form a plurality of air ducts of triangular shape.

10. An apparatus as claimed in claim 9, wherein at least one of the inside sections is connected to at least one of the middle sections by a flexible strap and the sections so connected form a cavity for a keel in said air cushion support base, said cavity for the keel communicating with the cavity formed by the inflatable skirt means.

11. An apparatus as claimed in claim 10 wherein the platform has corners and the apparatus comprises triangular sections which can be detachably mounted in the corners of the platform to connect the plurality of air can be detachably mounted in the corners of the platform to connect the plurality of air ducts.

* * * * *